3,203,590
UNIVERSAL PARTS FEEDER
William M. Maki, Martinsville, Ind., assignor to Fansteel Metallurgical Corporation, a corporation of New York
Filed Aug. 17, 1962, Ser. No. 217,746
5 Claims. (Cl. 221—175)

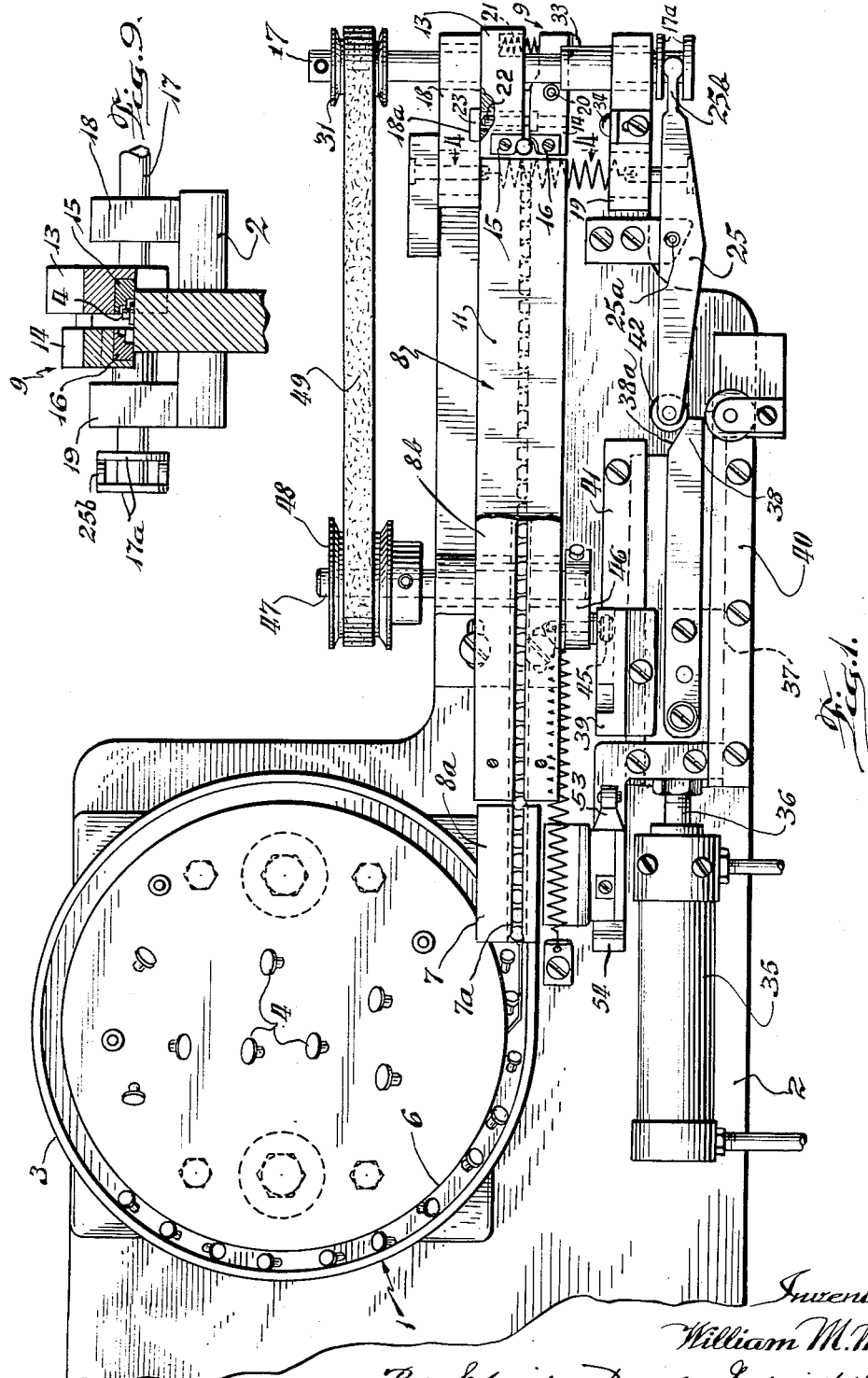

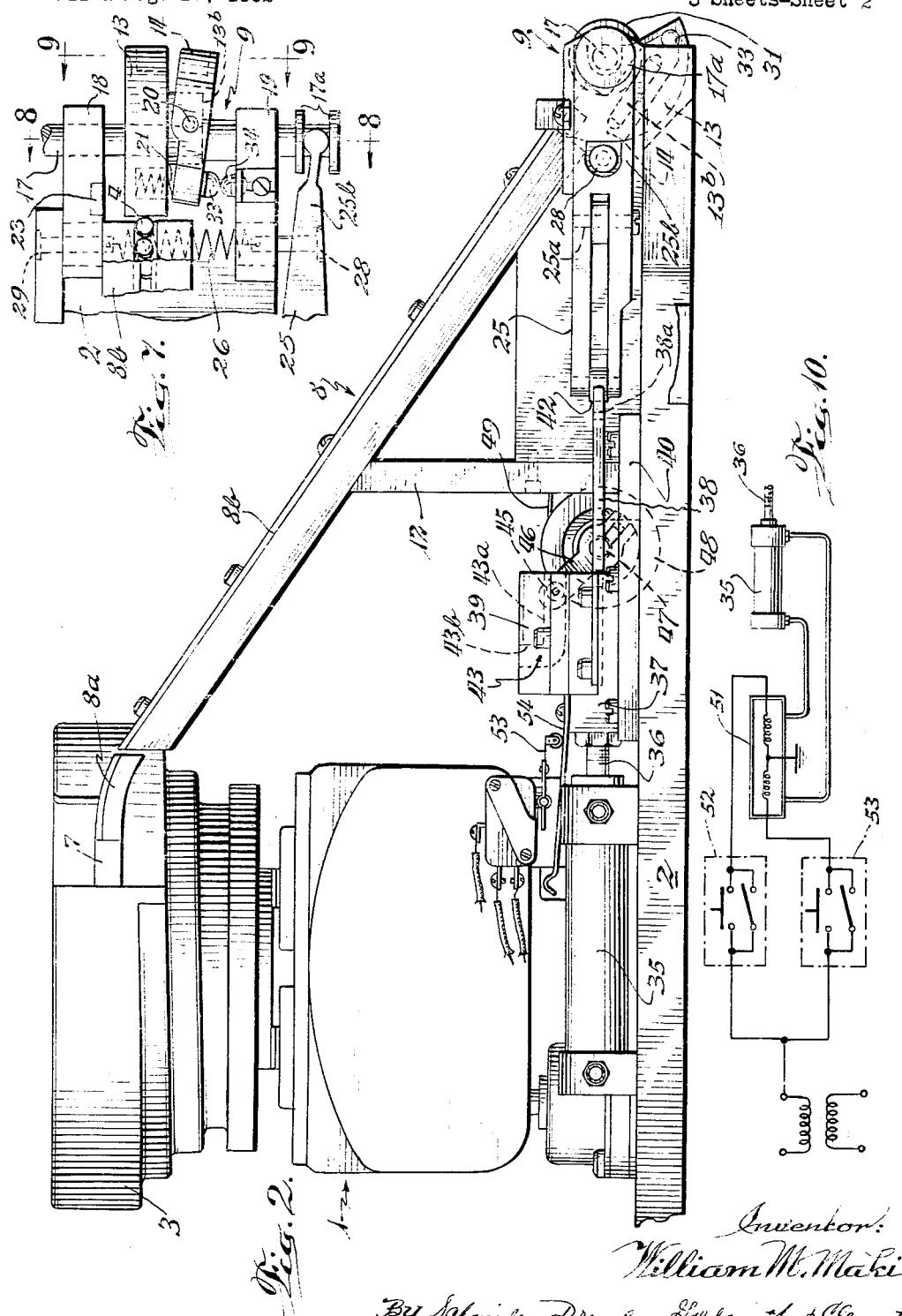

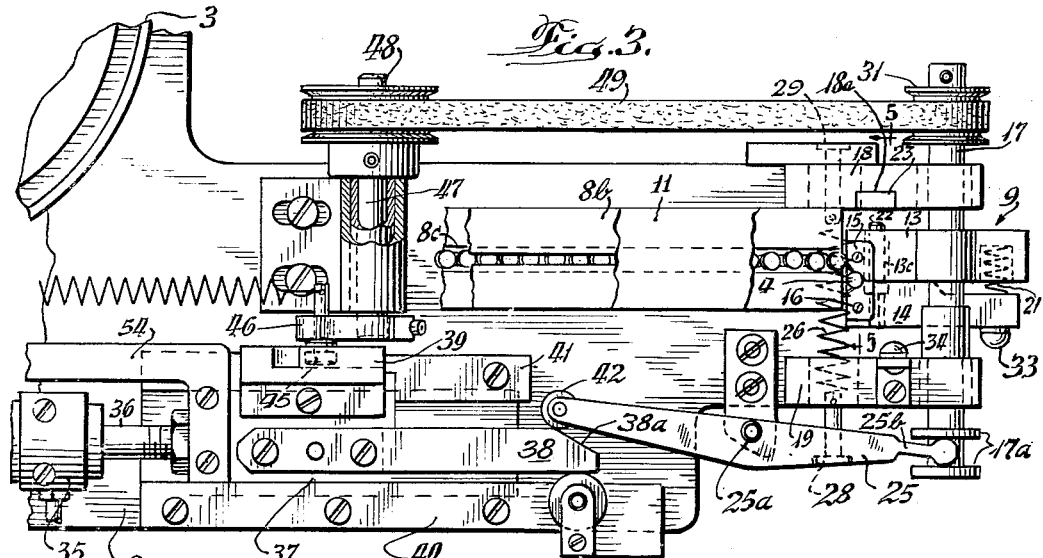
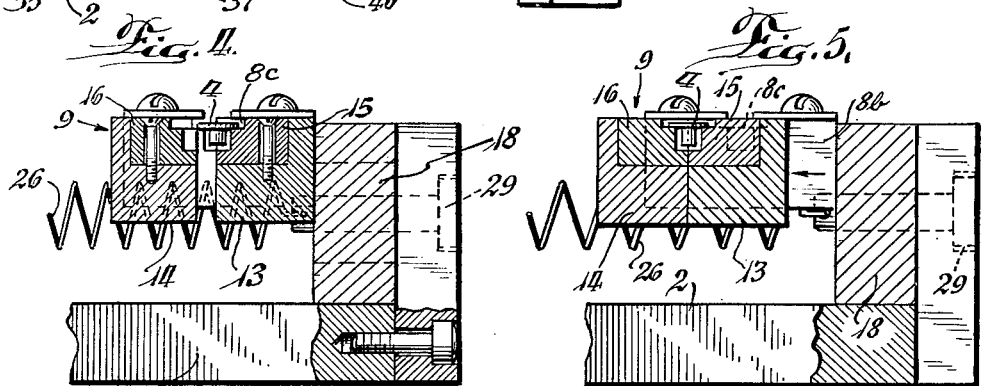
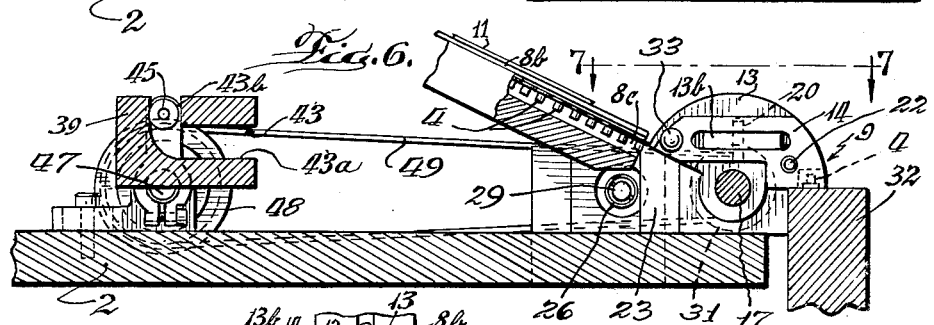
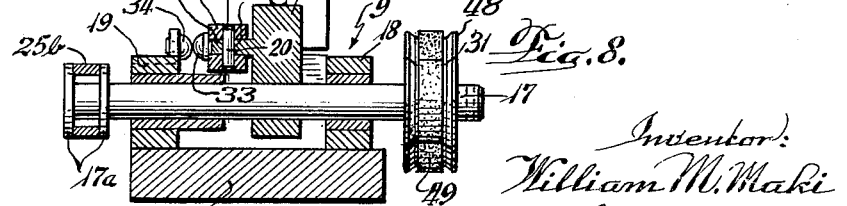

This invention relates to apparatus for feeding small parts, particularly to a mechanism capable of receiving parts in a random fashion and automatically delivering them one at a time to an assembly area.

At the present time, the feeding of small parts, such as washers, electrical contact buttons, discs, etc., to an area for assembly with another part is essentially a manual operation. The part is usually picked up by hand from a tray or other container, and transported to a punch press, spot welder, or other machine, where it is subsequently joined to another part. This is a time consuming procedure and presents handling problems due to the small size of the part being moved. As an example, it has been found that when securing contact rivets to a contact backing plate by the presently employed method, an operator can only turn out in the neighborhood of 800 assemblies during a normal working hour.

In accordance with the present invention, there is provided a feeding apparatus that is constructed and arranged to receive parts, such as washers, electrical contact buttons, discs, etc., in a random manner and continuously feed the parts to a positioner. The positioner is automatically operated to feed one part at a time to a work station where it is to be assembled with another part. This method of operation eliminates handling the individual parts and enables the operator to turn out 1200–1400 rivet backing plate assemblies in a normal working hour. This substantially reduces the unit cost of producing the assembly of which the item is a part.

The apparatus embodying applicant's invention is self-contained and can handle any small item that can be oriented and fed down a track. The apparatus has a great degree of flexibility in that it can be adapted to handle different items by changing very few parts of the machine. The feeder assembly can be readily attached to almost any spot welder, punch press, inline machine, turntable machine, etc.

Briefly, the apparatus consists of a device for aligning and orientating a plurality of scrambled parts. The parts are then directed down a track into a positioner which grips a part emptied from the end of the track and places it at an assembly area. The positioner is designed to prevent the emptying out of other parts from the track when it is operated to move a part to the preselected location. The part is deposited at the assembly area and the positioner is returned to repeat the cycle. The apparatus can be controlled by suitable electrical, hydraulic, or pneumatic systems, as desired.

In the instant case, the feeding mechanism is described and illustrated as feeding contact rivets to an assembly station where it is welded to a contact backing plate. However, as previously indicated, the apparatus can be adapted to handle other parts, such as discs, electrical contact buttons, washers, etc.

Other features and advantages of the present invention will appear from the following description when taken in conjunction with the accompanying drawings, in which:

FIGURE 1 is a plan view of the feeding apparatus;
FIGURE 2 is a side view of the apparatus disclosed in FIGURE 1;
FIGURE 3 is an enlarged plan view showing the positioner mechanism in the shifted position;
FIGURE 4 is a partial sectional view taken along lines 4—4 of FIGURE 1;
FIGURE 5 is a partial sectional view taken along lines 5—5 of FIGURE 3;
FIGURE 6 is a partial sectional view showing the positioner mechanism rotated to deposit a part at the assembly station;
FIGURE 7 is a plan view taken along lines 7—7 of FIGURE 6;
FIGURE 8 is a sectional view taken along lines 8—8 of FIGURE 7;
FIGURE 9 is a sectional view taken along lines 9—9 of FIGURE 7; and
FIGURE 10 is a schematic view of the control system for the positioner mechanism.

Referring first to FIGURES 1 and 2, there is illustrated a vibrating type hopper 1 mounted on a base plate 2. The hopper 1 includes a bowl 3 in which there is located a quantity of electrical contact rivets 4 to be subsequently secured to a backing plate by welding or some other selected method. The rivets 4 are dumped in the hopper at random and the hopper bowl is vibrated to locate the rivets in a single line on a spiral track 6 located around the inside periphery of the bowl 3. The details of the vibrating hopper are not important to an understanding of the present invention and, if further information regarding a mechanism of this type is desired, it can be found by referring to literature put out by the Syntron Company.

The rivets moving up the spiral track are directed into an interchangeable orientator 7, which positively locates the rivets relative to a downwardly inclined main track assembly 8. The particular orientator arrangement selected is determined by the parts to be fed down the inclined track. The orientator is constructed to define an opening 7a to receive the particular parts in the hopper bowl. The orientator leads into the track 8 for feeding the rivets to the positioner described in detail hereinafter. If desired, a centerboard hopper could be employed. A centerboard hopper of the type that could be used would include a bowl and an oscillating blade that would pick up a row of rivets from the bowl and direct them into a suitable orientator.

When a vibrating hopper is used, the main track, which is interchangeable to facilitate handling by the feeding apparatus of a variety of parts, is made up of a curved section 8a and a downwardly inclined straight section 8b. The slope of the track is such that the parts in it will move downward by gravity. Over both of these sections there is provided a cover plate 11, which retains the rivets in the track sections so that they will stay in line and not climb over the ones in front. The track sections 8a, 8b have a milled out slot 8c that is designed to receive the part being directed thereto by the orientator. The track assembly 8 is secured to the hopper 1 in a conventional manner and is supported relative to base plate 2 by braces 12.

The track section 8b empties into the positioner mechanism 9 which receives the contact rivet between two jaw members. The positioner is then shifted sideways to prevent the remaining rivets in the track from emptying out, and then rotated to move the rivet to an assembly station. At the assembly station, the rivet is released and the positioner is returned to its original position to receive another rivet from the mouth of the track.

The positioner mechanism includes two jaw clamping members 13, 14 to which are secured inserts 15, 16, respectively, that are shaped to receive a rivet from the mouth of the track section 8b. The jaw member 13 is semi-cylindrical in shape (see FIGURE 2) and is pinned to shaft 17. The shaft 17 is supported in bearing blocks 18, 19 connected to base 2. The generally semi-cylindrical shape of the jaw member 13 is provided so that when it is shifted sideways in a manner discussed in detail hereinafter it will prevent the remaining rivets in track 8 from emptying out.

The jaw member 14 is pivotally mounted relative to jaw member 13 by a pin 20 extending through jaw member 14 and a hole 13a in a transversely extending flange portion 13b of jaw member 13 (see FIGURE 8). The jaw members are biased into clamping engagement about the rivet 4 by a spring 21 disposed between their opposing end portions.

As shown in FIGURE 1, the jaw members 13, 14 are held in spaced relationship to receive a part from the track 8 by a jaw opening pin 22. The pin 22 is press-fitted in a hole in jaw member 14 and extends through a clearance hole 13c in jaw member 13 to contact a block 23 located in a slot 18a in bearing block 18. The portion of jaw opening pin 22 extending through jaw member 13 is longer than the width of jaw member 13 so that it engages the block 23 to bias jaw member 14 away from jaw member 13 to admit a rivet between the inserts 15, 16.

After a contact rivet is disposed between the jaw inserts 15, 16, the positioner assembly 9 is moved sideways to the position shown in FIGURE 3 by transverse movement of the shaft 17. This moves the jaw opening pin 22 out of engagement with block 23 and allows spring 21 to move the jaws into clamping engagement about the rivet.

The transverse movement of the positioner is accomplished by lever 25 that is pivotally mounted at 25a to base plate 2. The lever 25 has a fork end portion 25b that is located between spaced collars 17a on the shaft 17. This arrangement permits the shaft to be rotated independently of the lever. The fork lever 25, shaft 17, and jaw members 13, 14 are normally biased into the position shown in FIGURE 1 by a tension spring 26 connected between a bolt 28 secured to the fork lever and a bolt 29 connected to the base plate 2. The pivotal movement of lever 25 is controlled by a pneumatically operated cylinder and cam assembly which will be described in detail hereinafter.

After the shaft and jaw members are moved sideways to the position shown in FIGURE 3 by fork lever 25, the shaft 17 is rotated by a belt driven pulley 31 connected to shaft 17 at its end opposite fork lever 25. The operation of the pulley system is also controlled by the pneumatic cylinder and cam assembly to be described below.

Rotation of the shaft 17 and jaw members 13, 14 places the rivet on a block 32 that is representative of an assembly station where the rivet is secured to a backing plate to form a contact assembly. When the rivet is placed on the block 32, it is released from the clamping jaws by the interengagement of a steel button 33 secured to the end of jaw member 14 with a semispherical cam block 34 secured to bearing block 19. Thus, as shown in FIGURE 7, interengagement between button 33 and cam block 34 pivots jaw member 14 and causes insert 16 to move away from insert 15 to release the rivet clamped therebetween.

As previously mentioned, the positioner mechanism 9 is moved sideways and rotated by a pneumatically operated cam assembly. The assembly includes a double acting pneumatic cylinder 35 that regulates the movement of a rod 36 that is connected to a slide member 37 to position a pair of cams 38, 39 to control the linear and rotational movement of the positioner.

As shown in FIGURE 1, the slide member 37 is slidably disposed between two plates 40, 41 secured to base plate 2, and the cams 38, 39 are suitably secured to the slide member 37. The cam 38 defines an inclined cam surface 38a that engages a cam follower 42 connected to one end of fork lever 25 to move the fork lever clockwise about its pivot 25a and effectuate transverse movement of positioner 9.

The positioner 9 is rotated by operation of cam 39, which defines an L-shaped cam slot 43 in which is located a cam follower 45. Movement of the follower 45 rotates shaft 17 through the action of connecting link 46, shaft 47, pulley 48, and timing belt 49, and pulley 31.

The cam slot 43 has a longitudinally extending or dwell portion 43a and a vertically extending portion 43b. As shown in FIGURE 2, the length of the dwell is set so that the shaft 17 will not be rotated until cam 38 has engaged the cam follower 42 to move the positioner sideways out of alignment with the track 8. After the positioner has been moved to the position shown in FIGURE 3, the cam 39 directs the cam follower 45 up the vertically extending slot portion 43b to rotate the connecting link 46, shaft 47, pulley 48, and timing belt 49 to rotate the positioner 9 to deposit the rivet at the assembly station.

The movement of the cylinder rod 36 is determined by a valve 51 which controls the flow of air to and from opposite sides of the cylinder (see FIGURE 10). The valve 51 is controlled by a pair of switches 52, 53 which are operated when the cylinder is at its extended and retracted position to move the positioner between its unloading and receiving positions, respectively. In the present embodiment, one of the switches 52 is located so that it is closed when the machine used to connect the rivet to the backing plate is operated. The switch 52, when closed, functions to complete a circuit to move valve 51 to a position where it directs fluid to the left-hand side of the cylinder 35 to extend the rod 36 and associated cams. This switch is of the impulse, or similar, variety so that it is only momentarily closed to complete the aforementioned circuit. Only a very short time is needed since the cylinder will very quickly operate the positioner to deposit a rivet at the assembly station 32. Within the time it takes to move rod 36 to the right, the impulse switch 52 opens to allow valve 51 to be repositioned.

The second switch 53 is controlled by an upwardly inclined plate 54 secured to the slide member 37. Thus, when the cylinder rod 36 reaches its fully extended position, the switch 53, which is normally open, is closed to reposition the valve to direct fluid to the right-hand side of the cylinder 35. The rod 36 and slide member 37 are then moved to the left to return the cams and the positioner 9 to the position shown in FIGURE 1, where it is again in position to receive another part and repeat the cycle.

The method of operation of this apparatus is as follows:

Parts placed at random in the vibratory hopper 1 are moved up the spiral track 6 into the orientator 7 and from there into the track 8. The part emptied out from the mouth of track 8 is directed into the space between the inserts 15, 16 of the jaw members 13, 14 of the positioner 9. When the machine is started up a contact rivet and backing plate assembly are placed on the block 32 and the machine for securing them together is operated. During the time the first rivet-backing plate assembly is being produced the impulse switch 52 which positions the valve 51 to direct fluid to cylinder 35 to extend the rod 36 and move the slide member 37 is momentarily closed. This movement of the slide member brings the cam 38 into engagement with cam follower 42 to move the fork lever 25 in a clockwise direction and move the positioner transversely of the track 8. After the positioner has been moved out of alignment with track 8, the cam follower 45 is moved up cam slot 43b to drive the belt 49 and rotate the positioner to place the part at the assembly station 32. When the part is located at station 32, the cam block 33 comes into engagement with the cam block 34 to pivot the jaw member 14 relative to jaw member 13 and release the part disposed therebetween. When the positioner has reached this position the plate 54 closes switch 53. The closing of switch 53 repositions valve 51 to empty air from the left-hand side of cylinder 35 and direct air to the right-hand side of cylinder 35 to return the slide member 37, cams 38, 39, and positioner 9 to the position shown in FIGURE 1. The positioner mechanism is then in position to receive a subsequent part and start the cycle over again.

It will be appreciated that numerous modifications may be made without departing from the scope of the invention. For example, the particular construction of the positioner mechanism, pneumatically operated cam assembly, and the hopper and track means are but illustrative of other apparatus that could be employed.

It is, of course, desired to cover by the appended claims all such modifications that fall within the terms thereof.

I claim:

1. Apparatus for feeding parts to an assembly station including a parts container, a track connected to said container, means for directing parts from the container into one end of the track, a positioner mechanism disposed adjacent the other end of the track for receiving a part therefrom, lever means for transversely moving the positioner to block off said track, pulley means for rotating said positioner to locate the part at an assembly station, cam operated means in cooperative engagement with said lever and pulley means, means for releasing said part from the positioner, and means for controlling the operation of said cam operated means.

2. A feeder assembly including a parts container, a track connected to said container, means for directing parts from the container into one end of the track, a positioner mechanism disposed adjacent the other end of the track for receiving a part therefrom, means for supporting said positioner, said positioner mechanism including a shaft and a pair of clamping jaws secured thereto for receiving a part therebetween, pulley and lever means secured to opposite ends of said shaft for imparting rotational and transverse movement to said shaft, cam operated means in cooperative engagement with said pulley and lever means to move the positioner transversely and rotate same to locate a part held thereby at a place to be used, interengaging means on said support and positioner for releasing said part from said clamping jaws, and means for controlling the operation of said cam operated means.

3. Apparatus for feeding small parts from a track containing a plurality of aligned parts to an assembly station including a positioner mechanism comprising clamping jaws adapted to receive a part therebetween from an end of said track, means biasing said clamping jaws into clamping engagement with said part, means for preventing said clamping means from engaging with the part until the positioner is moved away from the end of said track, one of said jaws being constructed and arranged to block off said end of the track when the positioner is moved relative thereto, means for moving said clamping means transversely of said track, means for rotating said clamping jaws, and means for separating said clamping jaws to release the part disposed therebetween to deposit the part at the assembly station.

4. A mechanism for feeding small parts including a frame means, a shaft movably supported by said frame, a pair of jaws mounted on said shaft and adapted to receive and clamp therebetween a part from the end of a track disposed adjacent thereto, lever means secured to one end of said shaft, pulley means secured to the other end of said shaft, cam operated means for positioning said lever and pulley means for first transversely moving and then rotating said shaft to dispose the part between the jaws at a place to be used, and interengaging means on one of said jaws and frame for opening said jaws to deposit said part.

5. A mechanism for feeding small parts including a frame means, a shaft movably supported by said frame, a pair of jaws mounted on said shaft and adapted to receive and clamp therebetween a part from the end of a track disposed adjacent thereto, lever means secured to one end of said shaft, pulley means secured to the other end of said shaft, means for positioning said lever and pulley means for first transversely moving and then rotating said shaft to dispose the part between the jaws at a place to be used, motor operated cam means for moving said last-mentioned means, control means for actuating said motor means, and interengaging means on one of said jaws and frame for opening said jaws to deposit said part.

References Cited by the Examiner

UNITED STATES PATENTS

| | | |
|---|---|---|
| 1,740,575 | 12/29 | Clausen et al. |
| 1,786,608 | 12/30 | Halstead. |
| 1,786,609 | 12/30 | Halstead. |
| 1,909,813 | 5/33 | Crosbie. |
| 2,358,413 | 9/44 | Monaco _____ 214—7 |
| 2,584,466 | 2/52 | Kaserman. |
| 2,662,646 | 12/53 | McCain _____ 221—210 X |
| 2,991,892 | 7/61 | De Haas. |
| 3,012,344 | 12/61 | Schott _____ 221—175 |
| 3,048,281 | 8/62 | Godfrey. |

HUGO O. SCHULZ, *Primary Examiner.*

GERALD M. FORLENZA, *Examiner.*